United States Patent
Fong et al.

(10) Patent No.: US 11,070,983 B2
(45) Date of Patent: Jul. 20, 2021

(54) ACTIVE CASE APPARATUS PROVIDING LOCAL OFF-DEVICE RESOURCES

(71) Applicant: PPIP LLC, Tempe, AZ (US)

(72) Inventors: Michael Fong, Tempe, AZ (US); Nerie Hsin-wu Fong, Tempe, AZ (US)

(73) Assignee: PPIP, LLC, Chandler, AZ (US)

( * ) Notice: Subject to any disclaimer, the term of this patent is extended or adjusted under 35 U.S.C. 154(b) by 0 days.

(21) Appl. No.: 16/409,507

(22) Filed: May 10, 2019

(65) Prior Publication Data

US 2019/0349752 A1 Nov. 14, 2019

Related U.S. Application Data

(60) Provisional application No. 62/671,314, filed on May 14, 2018.

(51) Int. Cl.
*H04W 88/04* (2009.01)
*H04W 12/50* (2021.01)
*H04B 1/3888* (2015.01)
*H04W 12/08* (2021.01)
*H04W 12/033* (2021.01)
(Continued)

(52) U.S. Cl.
CPC .......... *H04W 12/50* (2021.01); *H04B 1/3888* (2013.01); *H04W 12/033* (2021.01); *H04W 12/08* (2013.01); *H04W 12/126* (2021.01); *H04W 12/37* (2021.01)

(58) Field of Classification Search
CPC ............. H04M 1/6041; H04M 1/6075; H04M 19/047; H04M 1/04; H04M 1/23; H04M 1/72527; H04M 1/72552; H04M 1/667; H04M 1/72505; H04M 1/72577; H04M 1/727; H04M 11/06; H04M 1/6083; H04M 1/6091; H04M 1/72519; H04M 1/7253; H04M 1/7255; H04M 1/72558; H04M 1/72569; H04M 1/72572
See application file for complete search history.

(56) References Cited

U.S. PATENT DOCUMENTS

| | | | | |
|---|---|---|---|---|
| 2003/0078071 | A1* | 4/2003 | Uchiyama | H04M 1/006 455/557 |
| 2009/0023475 | A1* | 1/2009 | Chang | H04M 1/72527 455/557 |
| 2014/0059623 | A1* | 2/2014 | Hasenei | H04N 21/414 725/85 |

* cited by examiner

*Primary Examiner* — Quan M Hua
(74) *Attorney, Agent, or Firm* — Fernando & Partners, LLP (57) ABSTRACT

In accordance with some embodiments, an apparatus for privacy protection includes a housing arranged to hold a personal communication device. The apparatus further includes at least one off-device resource supported by the housing that provides an alternate to a corresponding on-device resource integrated within the personal communication device. The apparatus also includes a local communication device coupled to the at least one off-device resource and supported by the housing, where the local communication device includes a personal communication device interface modem operable to provide a communication channel between the at least one off-device resource and the personal communication device. Additionally, the apparatus includes a controller coupled to the at least one off-device resource and the local communication device, where the controller is operable to manage resource scheduling between the at least one off-device resource and the corresponding on-device resource through the communication channel provided by the local communication device.

20 Claims, 7 Drawing Sheets

(51) Int. Cl.
*H04W 12/37* (2021.01)
*H04W 12/126* (2021.01)

ACTIVE CASE APPARATUS PROVIDING LOCAL OFF-DEVICE RESOURCES

PRIORITY CLAIM

This application claims priority to U.S. provisional patent application No. 62/671,314 filed on May 14, 2018, the contents of which are hereby incorporated by reference.

TECHNICAL FIELD

This relates generally to the field of privacy protection, and more specifically to an apparatus that provides supplemental resource for privacy protection of electronic devices.

BACKGROUND

Smartphones are central to daily life. However, due to smartphone designs, each layer of a mobile device stack, e.g., from a hardware layer at the bottom to a firmware layer above the hardware layer, then an operating system layer and an application layer on top of the firmware layer, is vulnerable. Further, many privacy protection solutions focus on the software layer and above. These solutions are inadequate in privacy protection for at least two reasons. First, software-only protection cannot detect attacks to the firmware and/or hardware, e.g., hardware side channel attacks that derive private user data. As such, there exists a hardware gap in the mobile device stack that is unprotected and/or vulnerable. Second, executing privacy protection software on a smartphone consumes computational resources and/or power of the smartphones. As such, many smartphone users are unwilling to use conventional privacy protection solutions or finding ways to disable them.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (e.g., a smart case, a safe case, a secure case, an active base, or a case) for a personal communication device (e.g., a smartphone, a wearable device, or a tablet, etc.) that provides supplemental resources, such as processing, memory, security, and communication links etc., in order to detect potential compromise of the personal communication device and protect the privacy of the personal communication device. The supplemental resources are provided to the personal communication device as local off-device resources, such that these resources are outside a housing of the personal communication device, but can be used by the personal communication device. Further, these supplemental resources can provide alternate local communication, storage, and/or processing function to the personal communication device.

As is known in the art, computation offloading is the transfer of resource intensive computational tasks to an external platform. The resource intensive tasks may be for searching, virus scanning, image processing, artificial intelligence, and/or computational decision making, etc. Different from conventional computation offloading, the functions provided by the supplemental resources can replace certain functions performed by the personal communication device and/or supplement certain functions performed by the personal communication device. By replacing or supplementing the personal communication device, the apparatus disclosed herein in accordance with various embodiments enhances detection of intrusion to user private data on the personal communication device and enhances user privacy protection.

In accordance with some embodiments, an apparatus includes a housing arranged to hold a personal communication device; at least one off-device resource supported by the housing, wherein the at least one off-device resource provides an alternate to a corresponding on-device resource integrated within the personal communication device; a local communication device coupled to the at least one off-device resource and supported by the housing, wherein the local communication device includes a personal communication device interface modem operable to provide a communication channel between the at least one off-device resource and the personal communication device; and a controller coupled to the at least one off-device resource and the local communication device, wherein the controller is operable to manage resource scheduling between the at least one off-device resource and the corresponding on-device resource through the communication channel provided by the local communication device.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual embodiment (as in any development project), numerous decisions must be made to achieve the developers' specific goals (e.g., compliance with system and business-related constraints), and that these goals will vary from one embodiment to another. It will also be appreciated that such development efforts might be complex and time consuming, but would nevertheless be a routine undertaking for those of ordinary skill in the art of image capture having the benefit of this disclosure.

Figure 1:
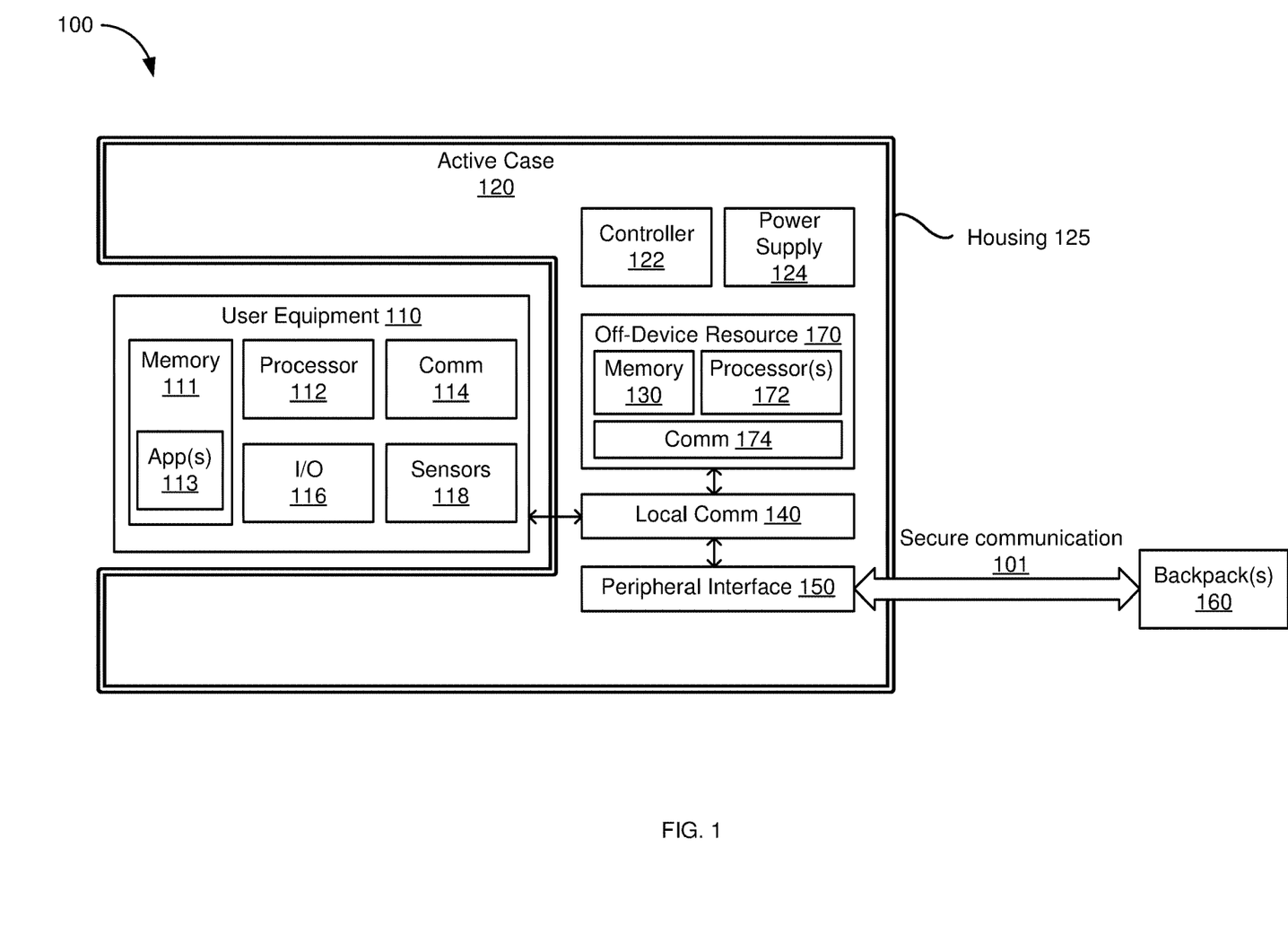
FIG. 1 is a block diagram of an exemplary active case holding a user equipment and connectable to a supplemental functional device in accordance with some embodiments.

Referring to FIG. 1, a simplified block diagram 100 of an apparatus 120 (also known as a smart case, a safe case, a secure case, an active base, or a case) holding a personal communication device 110 (also known as a user equipment) is depicted, in accordance with some embodiments. Different from a conventional base or case that merely provides structural support of another device, the active case 120 additionally monitors and analyzes the personal communication device 110 in order to determine whether the personal communication device 110 is a compromised device and takes actions to protect the personal communication device 110 against potential intrusion. As such, when the personal communication device 110 is held by the active case 120, the active case 120 enhances the security of the personal communication device 110.

In some embodiments, the apparatus 120 includes a housing 125 arranged to hold the personal communication device 110 (e.g., a smartphone, a wearable, a tablet, etc.). In some embodiments, the housing 125 includes a plurality of components mateable with another. In other words, the plurality of components, once mated with one another, form a housing assembly to hold the personal communication device 110. The housing assembly allows a user to insert the personal communication device 110 into the apparatus 120 for more protection of work-related sensitive information (e.g., in a work mode) or take the personal communication device 110 out of the apparatus 120 for less monitoring of the personal communication by enterprise (e.g., in a personal mode).

The active case 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially support and hold the personal communication device 110, e.g., a partial enclosure as shown in FIG. 1 or a whole enclosure encapsulating the personal communication device 110. When in the first position, the housing 125, along with other components of the active case 120, protects the personal communication device 110 against tracking or spying, e.g., by audio jamming, camera covering, and/or RF shielding, etc. When the one or more moveable components of the housing assembly are in a second position (e.g., hood slid up), a user can take the personal communication device 110 out of the housing 125 and place the personal communication device 110 in a non-protected mode.

In some embodiments, the active case 120 includes a peripheral interface 150 (e.g., a backpack interface) to connect to a supplemental functional device 160 (e.g., a backpack). A supplemental functional device, as described herein, is a device connectable to the user equipment 110 through the active case 120 and provides supplemental functional functions to the user equipment 110. In some embodiments, the supplemental functional device 160 includes a backpack that is a modular and detachable device. The backpack allows additional hardware and software functionality to be provided to a user of the personal communication device 110. In some embodiments, the supplemental functional device 160 is connected to the active base 110 through its peripheral interface connectable to the peripheral interface 150. In some embodiments, the peripheral interface 150 connects the supplemental functional device 160 to the active base 110 and the local communication device 140 further connects the peripheral interface 150 to the user equipment 110.

Figure 2A:
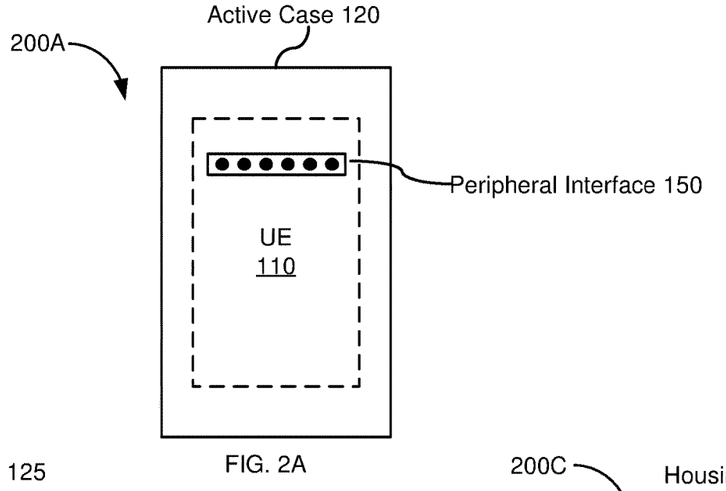
FIGS. 2A-2C are illustrations of exemplary peripheral interfaces connectable to a housing of the apparatus in accordance with some embodiments.
Figure 2B:
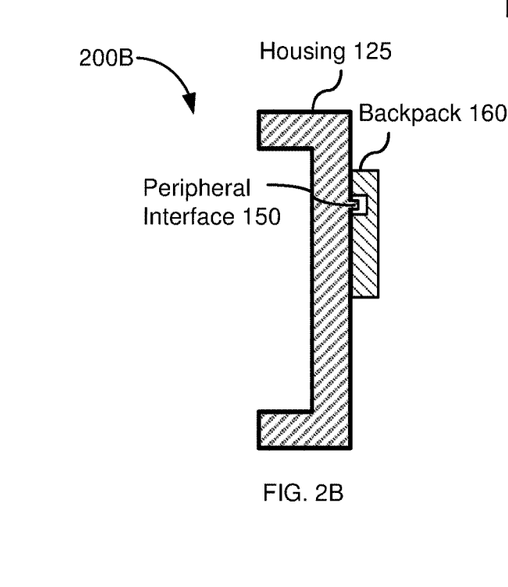
Figure 2C:
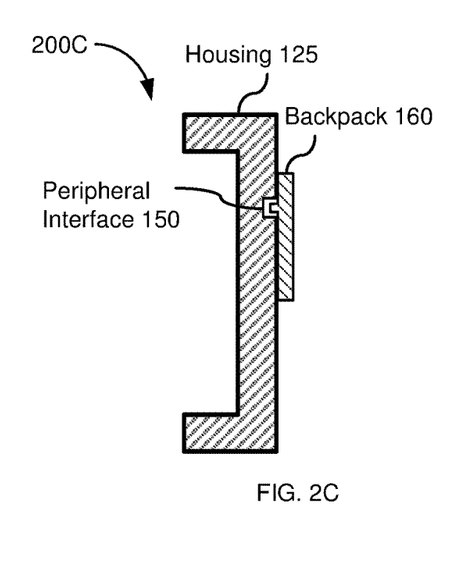

In some embodiments, the housing 125 at least partially supports the peripheral interface 150. For example, in an exemplary block diagram 200A shown in FIG. 2A, the peripheral interface 150 includes a number of connectors (e.g., contact pins or contact pads as indicated by the dots) connectable to the supplemental functional device 160. In some embodiments, the connectors are affixed to the housing 125 and at least partially supported by the housing 125, as shown in FIG. 2B. The connectors are mateable to the interface of the backpack 160. In some embodiments, as shown in FIG. 2C, the peripheral interface 150 is wholly supported by the housing 125, such that the peripheral interface 150 is integrated with or embedded in the housing 125 surface. In such embodiments, connectors from the backpack 160 can be plugged into the peripheral interface 150 in order to connect the backpack 160 to the active case 120. In the embodiments shown in FIGS. 2B and 2C, the peripheral interface 150 is operable to communicate with the supplemental functional device 160 via a physical channel including communication connectors. The physical channel forms a secure channel for communication 101 between the active case 120 and the backpack 160.

In some embodiments, as shown in exemplary block diagrams 200B and 200C in FIGS. 2B and 2C, the backpack 160 snaps onto the back of the active case 120 in order to be connected to the active case 120 for added functionality. It should be noted that though FIGS. 2A-2C illustrate the peripheral interface 150 with physical connectors, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the active case 120 can connect to a wireless communication enabled backpack device 160 through a wireless peripheral interface 150 or through a wireless modem of the local communication device 140. As such, a wireless communication enabled backpack 160 can communicate with the active case 120 without being in contact with the housing 125 or physically connected to the peripheral interface 150. Further, it should be noted that at least some components of the backpack 160 can be integrated into the active case 120 or vice versa. As such, in some embodiments, at least some supplemental functions provided by the backpack 160 can also be provided by the active case 120; and in some embodiments, some off-device resources are provided by the backpack 160.

In some embodiments, the active case 120 includes a local communication device 140 coupled to the peripheral interface 150 and supported by the housing 125. In some embodiments, the local communication device 140 includes a personal communication device interface modem (e.g., a WiFi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the active case 120 for validation. In the other direction, the communication channel carries information from the supplemental functional device 160 via the peripheral interface 150 to the personal communication device 110 in order to supplement the functionality of the personal communication device 110.

In some embodiments, the active case 120 includes at least one off-device resource 170 supported by the housing. The at least one off-device resource 170 provides an alternate (e.g., replacing or supplementing) to a corresponding on-device resource integrated within the personal communication device 110. For example, the at least one off-device resource 170 can include one or more processors 172, non-transitory memory 130, and/or at least one communication device 174 (e.g., cellular, GPS, WiFi, etc.). These off-device resources 170 can replace or supplement the processor 112, the memory 111, and/or the communication device(s) 114 of the user equipment 110. In some embodiments, the at least one off-device 170 is coupled to the local communication device 140 (e.g., WiFi, BT/BLE, infrared, NFC, lighting connector, etc.). In some embodiments, the local communication device 140 includes a personal communication device interface modem (e.g., a WiFi modem, BT/BLE radio, infrared radio, NFC radio, lighting connector, etc.) operable to provide a communication channel (e.g., wirelessly or via physical connection) between the at least one off-device resource 140 and the personal communication device 110.

In some embodiments, the active case 120 includes a controller 122 coupled to the peripheral interface 150, the at least one off-device resource 170, and the local communication device 140. Embodiments of the controller 122 include hardware, software, firmware, or a combination thereof. In some embodiments, the controller 122 is operable to manage the communication channel between the personal communication device 110 and the backpack 160 and through the local communication device 140 and the peripheral interface 150. In other words, the controller 122 manages a segment of the communication channel between the personal communication device 110 and the active case 120 through the management of the local communication device 140, and the controller 122 manages a segment of the communication channel between the case 120 and the backpack 160 through the management of the peripheral interface 150. Further, in some embodiments, the controller is operable to manage the resource scheduling and communication between the at least one off-device resource 170 and corresponding on-device resource of the personal communication device 110 through the communication channel provided by the local communication device 140. For example, the controller 122 can send commands through the communication channel between the personal communication device 110 and the active case 120 to disable or enable the communication device(s) 114 of the personal communication device 110. The controller 122 can also schedule a redirection of the communication between the personal communication device 110 and an RF emitter to include the communication device(s) 174 in the communication path.

In addition to managing the communication channel, the controller 122 logs data in a secure area of the active case 120. Logging data in the secure area of the active case 120 has the advantage of providing trustworthy status report of the user equipment 110 for analysis in case the user equipment 110 has been or potentially has been compromised. For example, many high-value enterprises invest significantly to implement tight monitoring and access control within their own networks, but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

In some embodiments, the active case 120 includes a power supply 124. The power supply 124 supplies power to the peripheral interface 150, the local communication device 140, and the controller 122. In some embodiments, the power supply 124 includes at least one of a battery, a charging socket, a USB connector, a power plug, and/or a power socket. In some embodiments, the power supply 124 includes a connector for a battery. As such, in some embodiments, the power supply 124 is also operable for providing power to other devices, e.g., to the user equipment 110 and/or the backpack 160 via the USB connector, connectors, and/or the peripheral interface(s) 150.

In some embodiments, the personal communication device 110 held by the active case 120 includes a processor 112, one or more communication devices 114, an input/output interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some embodiments, the processor 112 is coupled to the communication devices 114 in order to control the communication using the communication device 114, in accordance with some embodiments. In addition to controlling communication, the processor 112 processes data and executes applications 113, in accordance with some embodiments. In some embodiments, the processor 112 includes one or more chips chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicates with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processors 112, the input/output interface 116, the communication devices 114, or sensors 118 via a bus. In some embodiments, the applications 113 stored in the memory 111 include an application for exchanging information between the user equipment 110 and an external electronic device (e.g., the active case 120). The information exchange includes, for example, transmitting information obtained by the communication device 114 and/or sensors 118 to an external electronic device (e.g., the active case 120) or receiving information from the external electronic device, e.g., the information gathered by the supplemental functional devices 160 and relayed by the active case 120 via the peripheral interface 150 and the local communication devices 140.

In some embodiments, the input/output interface 116 provides a channel for input/output data between the processor 112 and input/output peripheral devices, such as a display, a keyboard, a mouse, a pen, microphones, cameras, and/or speakers of the user equipment 110. In some embodiments, the peripheral devices are connected to the input/output interface 116 wirelessly, e.g., via the communication devices 114.

In some embodiments, the communication device 114 connects the user equipment 110 and an external electronic device wirelessly or through a wired connection. In some embodiments, the external electronic device is the active case 120, such that the communication device 114 connects to the active case 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the user equipment 110 includes sensors 118, such as one or more accelerometers, gyroscopes, and/or magnetometers (e.g., as part of an inertial measurement unit (IMU)) for obtaining information concerning the position (e.g., altitude) of the user equipment 110, light sensors, or acoustic sensors. In some embodiments, the sensors 118 are coupled to the input/output interface 116, such that the information collected by the sensors 118 are passed to the processor 112 by the input/output interface 116 for further processing. For example, the input device camera uses light sensors for light sensing. In some embodiments, the sensors 118 are coupled to the communication device 114, such that the information collected by the sensors 118 is transmitted to another device (e.g., the active case 120) for validation. In some embodiments, the sensor 118 is coupled to the power supply (e.g., a battery) of the user equipment 110 for obtaining the power level of the user equipment 110.

The system as shown in FIG. 1 addresses the hardware gap in conventional privacy protection systems. In particular, the system as shown in FIG. 1 protects against exploitation of hardware vulnerabilities. For example, the active case 120 and/or the backpack 160 can have a unique, know, and/or verifiable identity that is generated and stored on the active case 120 and/or the backpack 160, e.g., in silicon. As such, the identity of the active case 120 and/or the backpack 160 does not leave the chip on the active case 120 and/or the backpack 160. Further, in some embodiments, the active case 120 includes secure information storage (e.g., in the memory 130 of the off-device resource 170), crypto acceleration (e.g., with the memory 130 and the processor 172 of the off-device resource 170), hardware-based execution controls (e.g., fixed starting execution point from the memory 130 without bypass of addresses in the memory 130), post-provision lockdown (e.g., the processor 172 not allowing debugging and/or allowing firmware modifications through trusted updates), and/or code-signing (e.g., with certificates from trusted sources stored in the memory 130), etc. As such, active case 120 and/or the backpack 160 can store information securely and have hardware-based execution controls to execute from trusted sources and prevent hardware side channel attacks.

Figure 3:
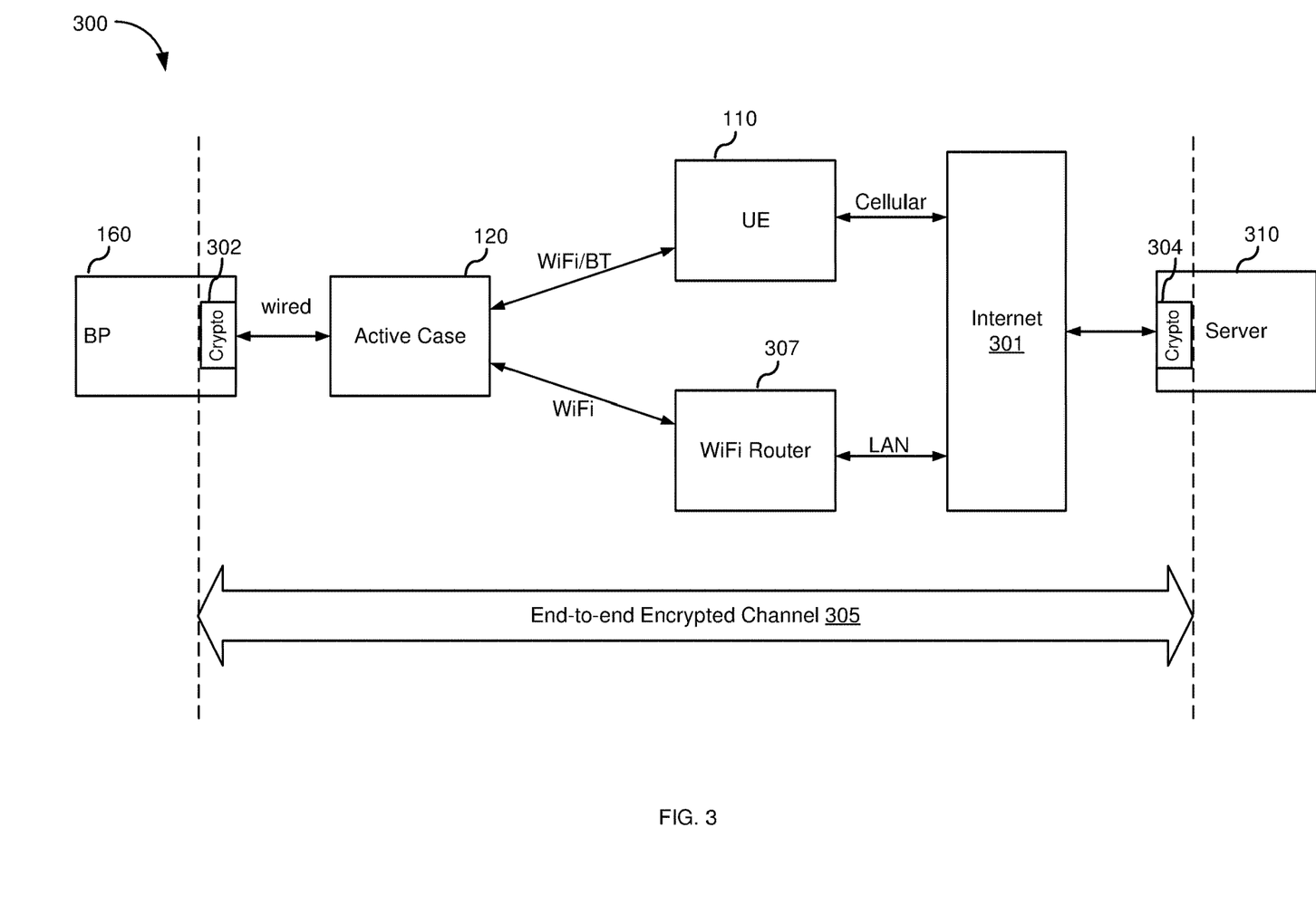
FIG. 3 is a block diagram of an exemplary secure and modular platform that provides an end-to-end encrypted channel in accordance with some embodiments.

FIG. 3 illustrates an exemplary secure and modular platform 300 in accordance with some embodiments. In some embodiments, the platform 300 includes the active case 120, the backpack 160, the personal communication device 110 held by the active case 120 and runs one or more applications, and a secure server 310 that comprises an online repository, analytics/processing, and/or client portal, etc. In some embodiments, an end-to-end encrypted channel is established between the backpack 160 and the secure server 310 through the active case 120 and/or the user equipment 110 for added security and privacy protection.

For example, the backpack 160 provides the supplemental functionality of RF energy detection. As such, the backpack 160 sniffs data in the air and performs local processing, such as data filtering and compression. The backpack 160 encrypts the processed data using a crypto unit 302 and exchanges encrypted data with the active case 120 through wired connection in some embodiments. The active case 120 routes traffic between the backpack 160 and the secure server 310, including the traffic through the user equipment 110 via an end-to-end encrypted channel 305. In some embodiments, the secure server 310 also includes a crypto unit 304 for encryption and decryption.

In some embodiments, the active case 120 communicates with the user equipment 110 and/or a WiFi router 307 wirelessly. The wireless communication is encrypted, and the communication between the user equipment 110/the WiFi router and the server 310 through the internet 301, regardless wireless or wired, is also encrypted. As such, the server 310, which controls and sends commands based on information stored in its database and through dashboards in accordance with some embodiments, communicates with the backpack 160 and/or the active case 120 through the end-to-end encrypted channel 305.

As explained above in connection with FIG. 1, the high-security system as shown in FIG. 3 addresses the hardware gap in conventional security systems and particularly protects against exploitation of hardware-based vulnerabilities. Further, the active case 120 and/or the backpack 160 provide a hardware root of trust for the broader intelligent modular system. Starting from the hardware layer, in some embodiments, the hardware root of trust includes specialized system and crypto architecture to create a root key using a hardware true random number generator. As such, the root key is not exposed and cannot be externally extracted. In some embodiments, the active case 120 and/or the backpack 160 can then generate a certificate signing request within the device. Accordingly, an appropriate X.509 certificate bundle can be produced, provisioned, and stored within the device to maintain stringent control of allowed processes for execution prior to deployment. In other words, the trusted and secure resources (e.g., the off-device resource 170, FIG. 1) are built on the platform.

These trusted and secure resources have processing, sensing, and communication capabilities that serve as building blocks for additional local off-device resources provided to the user equipment 110. In particular, the trusted and secure resources can then be used for anti-surveillance (e.g., audio and/or video), assured identity, and/or continuous multi-factor authentication for increased security and improved privacy protection. For example, the secure server 310 can obtain aggregated biometric data from multiple active cases 120 and/or backpacks 160. In some embodiments, the secure server 310 can store the aggregated biometric data and apply machine learning to train an authentication system. The active case 120 and/or backpack 160 can then independently obtain reliable user data using the trusted and secure resources and utilize the end-to-end encrypted channel 305 to transmit the reliable user data to the secure server 310 for continuous multi-factor authentication of the user of the user equipment 110 by the trained authentication system.

Figure 4:
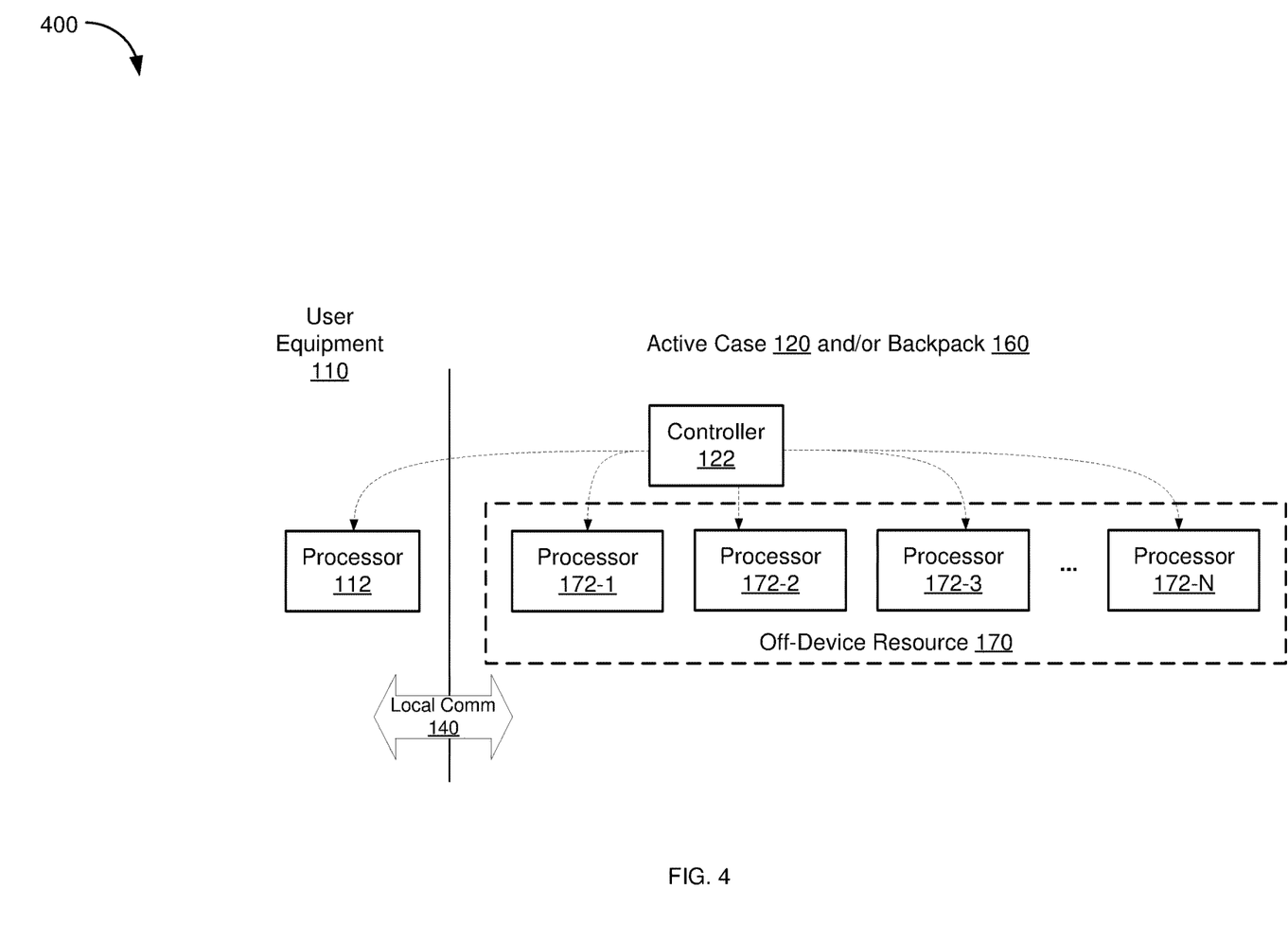
FIG. 4 illustrates an exemplary local off-device resource providing alternative processing capacity in accordance with some embodiments.

FIG. 4 illustrates an exemplary system 400 in which the at least one off-device resource 170 provides alternative processing capacity for the personal communication device 110 in accordance with some embodiments. As shown in FIG. 4, in some embodiments, the at least one off-device resource 170 includes one or more processors, e.g., the processors 172-1, 172-2, 172-3, . . . , 172-N. In some embodiments, the controller 122 manages resource scheduling between the processors 172-1, 172-2, 172-3, . . . , 172-N of the active case 120 and/or the backpack 160 and the corresponding on-device resource, e.g., the processor 112, of the personal communication device 110 through the communication channel provided by the local communication device 140.

In some embodiments, one or more of the processors 172-1, 172-2, 172-3, . . . , 172-N can be enabled to add additional processing power for intrusion detection and privacy detection. In some other embodiments, one or more of the processors 172-1, 172-2, 172-3, . . . , 172-N can be enabled to take over the processing function on behalf of the processor 112 for the personal communication device 110. In yet some other embodiments, at least a portion of the processors 172-1, 172-2, 172-3, . . . , 172-N can be enabled for the protection of at least a portion of the on-device processor 112.

For example, the on-device processor 112 can include one or more protection domains, sections, time slices, or portions reserved for executing different types of applications and/or programs, e.g., different portions for executing OS, kernel, device drivers, user applications, etc. The portion of the off-device processors 172 can be used to supplement or replace the one or more portions of the on-device processor 112, such that the execution of the malicious codes by the off-device resource 170 can be confined to the active case 120 and/or the backpack 160. Further, as explained above with reference to FIG. 3, in some embodiments, utilizing techniques such as code signing provided by the trusted and secure off-device resource 170, the malicious codes may be identified, e.g., by comparing the X.509 certificate with the signature of the malicious codes. As such, the malicious codes would not be able to access private information on the personal communication device 110. In some embodiments, upon identifying the malicious codes, the controller 122 can direct the processors 172 to stop the execution of the malicious codes, thus preventing the malicious codes from gaining access to the I/O devices 116 of the personal communication device 110.

In some embodiments, the enablement of the off-device resource 170 is triggered by a mechanical switch (e.g., one or more moveable parts of the housing 125 or a mechanical switch at least partially supported by the housing 125), a soft switch (e.g., commands), and/or based on context without user intervention (e.g., activating a rule or policy in response to detecting intrusion or triggered by geo-fencing). Once enabled, the resource scheduling by the controller can be performed through technics such as multiprocessor, distributed computing, and the like.

Figure 5A:
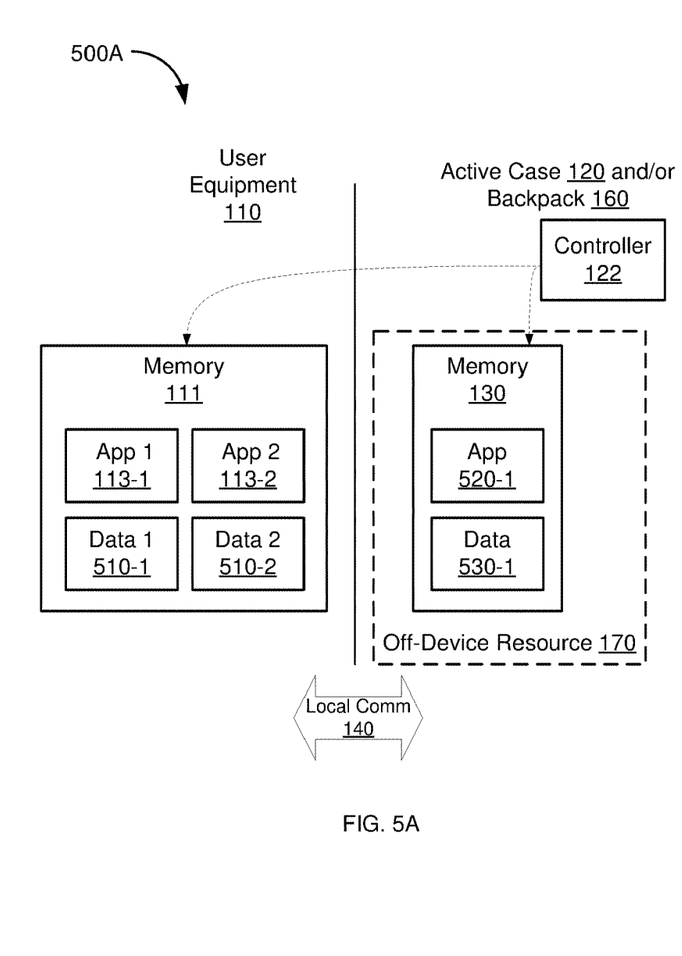
FIGS. 5A and 5B illustrate an exemplary local off-device resource providing alternative storage in accordance with some embodiments.
Figure 5B:
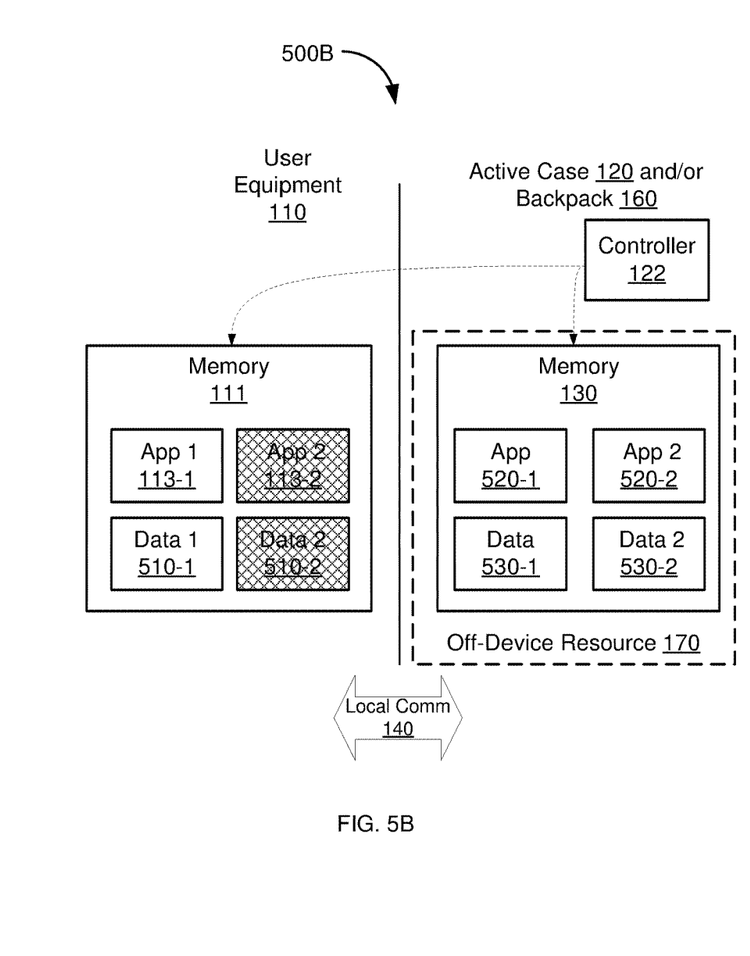

FIGS. 5A and 5B illustrate exemplary systems 500A and 500B in which the at least one off-device resource 170 provides alternative storage for the personal communication device 110 in accordance with some embodiments. In some embodiments, the at least one off-device resource 170 includes the non-transitory memory 130 operable to provide alternative storage for the personal communication device 110; and the corresponding on-device resource includes the non-transitory memory 111 of the personal communication device 110. In some embodiments, the controller 122 manages resource scheduling between the non-transitory memory 130 of the active case 120 and/or the backpack 160 and the corresponding on-device resource of the personal communication device 110, e.g., the non-transitory memory 111, through the communication channel provided by the local communication device 140.

In the exemplary system 500A as shown in FIG. 5A, the on-device memory 111 includes on-device applications 113-1 and 113-2 and data repositories 510-1 and 510-2; and the non-transitory memory 130 as part of the at least one off-device resource 170 includes an off-device application 520-1 and a data repository 530-1. In some embodiments, the controller 122 manages resource scheduling between the on-device memory 111 and off-device memory 130 through the communication channel provided by the local communication device 140. The off-device application 520-1 and data storage 530-1 provide an alternate to the on-device applications 113 and data repositories 510, such that the execution of the off-device application 520-1 provides additional functions to the personal communication device 110, e.g., extra malicious codes detection, etc., and the extra information stored in the data storage 530-1 facilitates the intrusion detection and privacy protection of the personal communication device 110, e.g., virus signatures, geo-fence boundary information, whitelist and/or blacklist of RF emitters.

In some embodiments, as shown in FIG. 5B, the resource scheduling performed by the controller 122 includes migrating or disabling of the on-device application 113-2 and data repository 510-2 from the on-device memory 111 and executing or enabling a corresponding off-device application 520-2 and data storage 530-2 on the off-device memory 130 (e.g., sandbox). For example, in response to detecting a malicious off-device application 520-1 and its associated data repository 510-2 by the active case 120 and/or the backpack 160, the controller 122 instructs the removal and/or quarantine of the malicious codes and the associated data and performs its analysis by executing the off-device application 520-2 and using the data storage 530-2 for off-device analysis. As such, the personal communication device 110 is protected against intrusion and the extra analysis can be performed by the off-device resource without impacting the performance of the personal communication device 110.

Figure 6A:
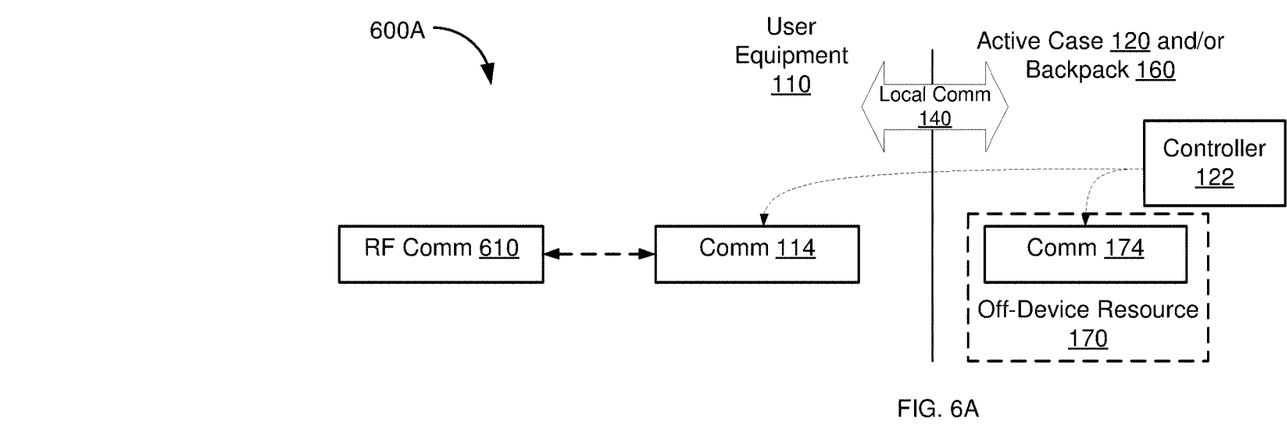
FIGS. 6A and 6B illustrate an exemplary local off-device resource providing alternative data transport in accordance with some embodiments.
Figure 6B:
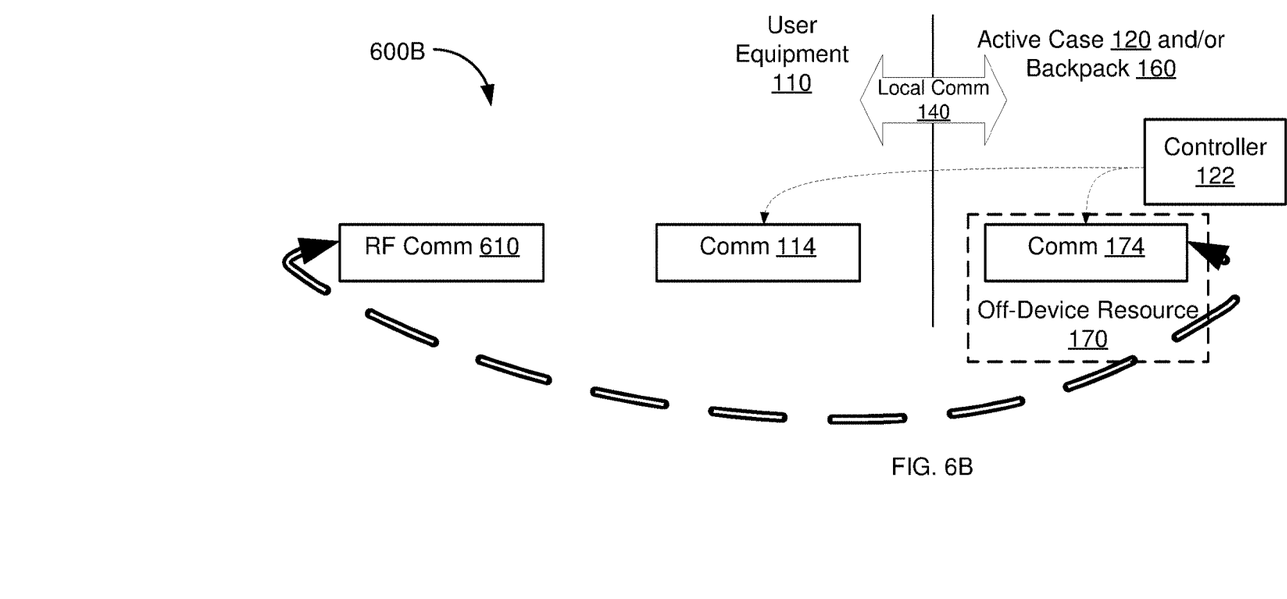

FIGS. 6A and 6B illustrate exemplary systems 600A and 600B in which the at least one off-device resource 170 provides alternative data transport for the personal communication device 110 in accordance with some embodiments. In some embodiments, the at least one off-device resource 170 includes the communication device 174 (e.g., cellular, WiFi, LoRa etc.) operable to provide alternative data transport for the personal communication device 110; and the corresponding on-device resource includes the communication device 114. In some embodiments, the controller 122 manages resource scheduling between the communication device 174 of the active case 120 and/or the backpack 160 and the corresponding on-device communication device 114 of the personal communication device 110 through the communication channel provided by the local communication device 140.

In the exemplary system 600A shown in FIG. 6A, the on-device communication device 114 communicates with an RF communication device 610. In some embodiments, as shown in FIG. 3 and described above, the RF communication device 610 is in direct communication with the on-device communication device 114 of the personal communication device 110, with the controller 122 coordinating between the off-device communication device 174 of the active case 120 and/or the backpack 160 in order to provide a secure communication channel. As such, the off-device communication device 174 adds extra security to the wireless communication between the personal communication device 110.

In the exemplary system shown 600B shown in FIG. 6B, the controller 122 directs the on-device communication device to communicate indirectly with the RF communication device 610. For example, the off-device communication device 174 serves as man-in-the-middle to communicate with the RF communication device 610 on one end and pass filtered information to the on-device communication device 114 through the local communication device 140 on the other end. As such, the off-device resource 170 behaves like a firewall to filter out malicious information (e.g., cookies, trackers) while allowing connectivity for the personal communication device 110.

Figure 7:
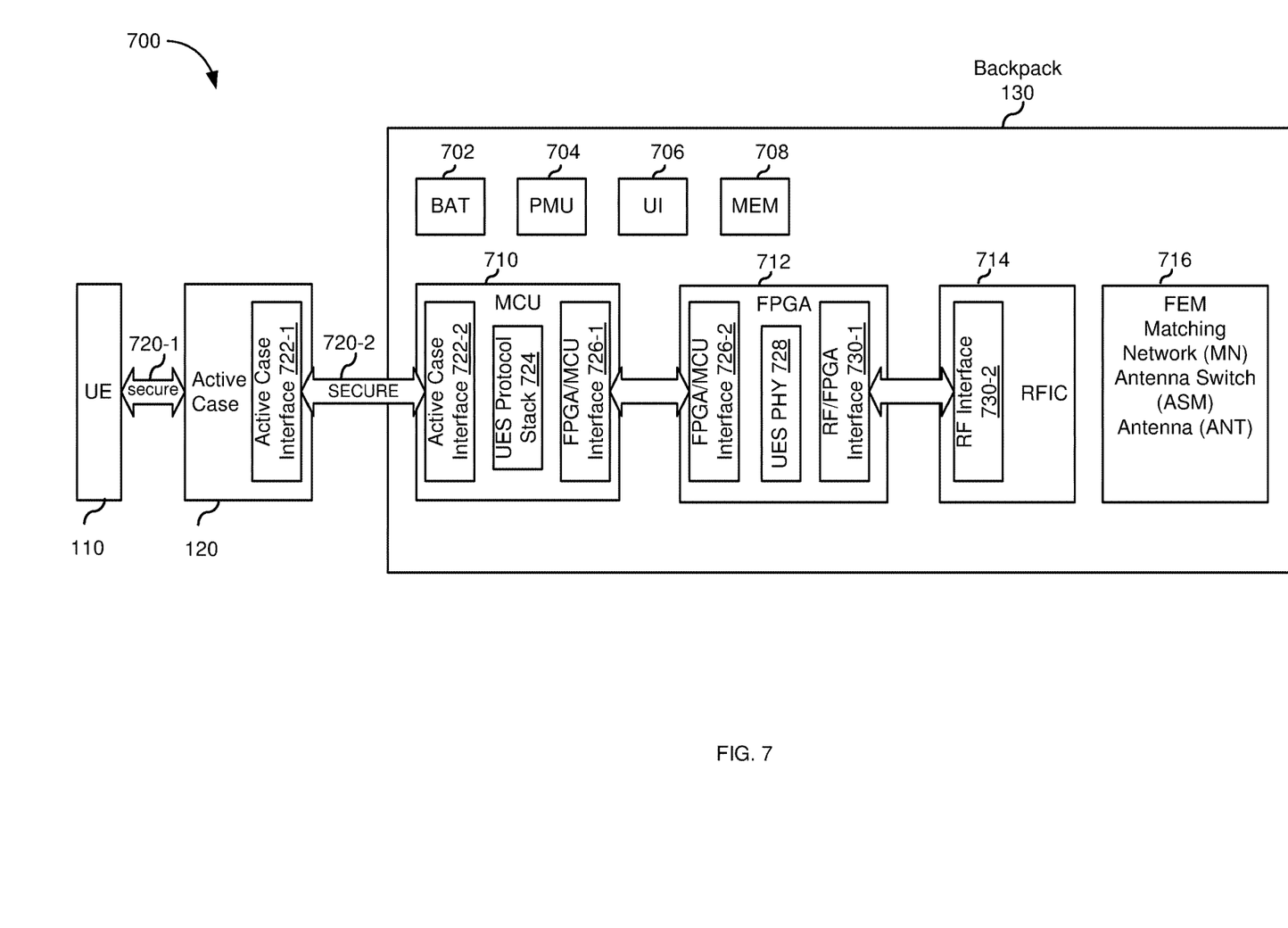
FIG. 7 illustrates an exemplary local off-device resource providing electronic isolation in accordance with some embodiments.

FIG. 7 illustrates an exemplary block diagram 700 of the at least one off-device resource including a security appliance operable to provide electronic isolation of data and/or communications for the personal communication device 110 in accordance with some embodiments. In some embodiments, the security appliance is a physical shield, e.g., as part of the housing 125 or as a separate mechanical part. In some embodiments, the security appliance is an electronic component, e.g., a Radio Frequency Integrated Circuit (RFIC) 714 as shown in FIG. 7.

In some embodiments, the backpack 160 includes a battery 702, a power management unit (PMU) 704, a user interface (UI) 706, a memory 708, a microcontroller (MCU) 710, a Field Programmable Gate Arrays (FPGA) 712, a Radio Frequency Integrated Circuit (RFIC) 714, and a frontend module (FEM) 716. It should be noted that at least some of the RF power detector functions can be integrated into the active case 120 in some embodiments. Thus, the RF power detector can be part of the active case 120, the backpack 160, or the combination of the active case 120 and the backpack 160. In other words, the UES can refer to the active case 120, the backpack 160, or the combination of the active case 120 and the backpack 160. For example, at least part of the functions performed by the MCU 710, the FPGA 712, the RFIC 714, and/or the FEM 716 can be performed by the controller 122, the one or more communication circuitries 140.

In some embodiments, the MCU 710 is connectable to the active case 120 through a secure channel 720, including the secure channel established through an Object Linking & Embedding (OLE) interface as an active case interface 722-1 on the active case 120 and the active case interface 722-2 on the MCU 710. In some embodiments, a peripheral interface (e.g., backpack bus or a wireless interface to a wireless capable backpack device) connects the MCU 710 to the active case 120, e.g., via physical connectors or wireless modem connectors).

In some embodiments, the active case 120 is operably connectable to the personal communication device 110 and the peripheral interface, which forms the secure communication channel 720, obtains uplink communication signals and downlink communicate signals of the personal communication device 110 through the active case 120. As such, the MCU 710 obtains information associated with the personal communication device 110 through the peripheral interface. In some embodiments, the MCU 710 is coupled to the FPGA 712 through an FPGA/MCU interface 726-1. The MCU 710 executes instructions implementing a protocol stack 724 for context-based data processing and decision making of RF detection. Further, the MCU 710 handles signaling and control, crypto communication, secure communication, and/or over-the-air (OTA) firmware update for the backpack 160. In some embodiments, the MCU 710 scans an RF spectrum of the communication signal that is received by the RF detection device (e.g., the RFIC 714) in order to identify communications associated with the personal communication device 110, the active case 120, and/or the backpack 160.

In some embodiments, the FPGA 712 is coupled to the MCU 710 through an FPGA/MCU interface 726-2 and is coupled to the RFIC 714 through an RF/FPGA interface 730-1. The FPGA 712 provides high speed data processing and digital filtering. In some embodiments, the FPGA 712 is operable to compare the energy detected by the RFIC 714 with a threshold in order to identify at least one energy burst and evaluate whether the at least one energy burst matches a signal protocol signature of the signal protocol.

In some embodiments, the RFIC 714 is coupled to the FPGA 712 through an RF interface 730-2. The RFIC 714 performs data conversion between RF and digital signals and is operable to detect energy carrying a communication signal to or from the personal communication device 110 and/or the active case 120. When in a receiving mode, the RFIC 714 allows the backpack 160 to perform its normal functions, e.g., RF signal detection etc. When in a transmitting mode, the RFIC 714 provides RF isolation of the user equipment 110, the active case 120, and/or the backpack 160. In some embodiments, the backpack 160 includes a remote communication device, operable to transmit wirelessly to a remote secure server. In some embodiments, the remote communication function is performed at least in part by the RFIC 714.

In some embodiments, the FEM 716 can detect RF signals and/or perform electromagnetic simulation, e.g., simulating RF performance, obtaining or setting RF characteristics as a function of carrier frequency, etc. In some embodiments, the FEM 716 includes at least one of an antenna tuner (also known as a matching network (MN)), an antenna switch (ASM), and/or an antenna (ANT) for wireless communication and/or electromagnetic simulation.

As explained above with reference to FIG. 1, the active case 120 has a housing 125 that is arranged to received and hold the user equipment 110. Further, the backpack 160 can be attached to the active case 120. As such, at least parts of the UES (e.g., the active case 120 and/or the backpack 160) are in close distance to the user equipment 110, e.g., in the range of millimeters. Accordingly, different from conventional threat detection systems and methods that detect and monitor the user equipment 110 from a distance, the UES can detect potential threats faster and the threat detection is more accurate, e.g., detecting a surge of RF energy when a compromised user equipment 110 falsely reports its antenna status. Further, the UES (e.g., the active case 120 and/or the backpack 160) is capable of controlling sensor paths and/or communication paths associated with the user equipment 110, e.g., disabling the sensors and/or communication devices on the user equipment 110 and/or re-directing the information from the user equipment 110. As such, the UES can quickly react to the accurate threat detection, e.g., shutting down the user equipment 110, stop execution of malicious codes by the processors 172 (FIG. 4), stopping the communication of the user equipment 110 with a remote source (as shown in FIGS. 6A and 6B), shielding sensitive data from the user equipment 110 (as shown in FIGS. 5A and 5B), etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a personal communication device;
   at least one off-device resource supported by the housing, wherein the at least one off-device resource, including a remote communication interface, provides an alternate to at least one corresponding on-device resource, including a communication interface, integrated within the personal communication device, wherein the remote communication interface provides an alternative data transport with a secure remote server;
   a local communication device coupled to the at least one off-device resource and supported by the housing, wherein the local communication device includes a local communication interface operable to provide a communication channel between the at least one off-device resource and the personal communication device; and
   a controller coupled to the at least one off-device resource and the local communication device, wherein the controller is operable to facilitate resource scheduling between the at least one off-device resource and the corresponding at least one on-device resource through the communication channel, including extending the communication channel to the secure remote server and utilizing the remote communication interface to direct communications associated with the communication interface to the secure remote server via the communication channel.

2. The apparatus of claim 1, wherein the at least one corresponding on-device resource includes a processor, and the at least one off-device resource includes one or more processors operable to provide alternative processing capacity for the processor.

3. The apparatus of claim 1, wherein the at least one corresponding on-device resource includes a storage, and the at least one off-device resource includes a secure non-transitory memory operable to provide alternative storage for the storage.

4. The apparatus of claim 3, wherein the controller is further operable to:
store an identifier of the apparatus in the secure non-transitory memory;
use the identifier to obtain a certificate of a safe process to be executed on the apparatus in response to a certificate signing request, and
store the certificate in the secure non-transitory memory.

5. The apparatus of claim 1, further comprising a crypto unit operable to encrypt the alternative data transport a between the personal communication device and the secure remote server through the communication channel.

6. The apparatus of claim 1, wherein:
the corresponding at least one on-device resource includes a first communication device;
the at least one off-device resource includes a second communication device; and
facilitating the resource scheduling between the at least one off-device resource and the corresponding at least one on-device resource through the communication channel includes:
disabling, via the communication channel, direct communication between the first communication device and a third communication device;
directing the second communication device to exchange messages with the third device; and
filtering the messages to communicate filtered messages to the first communication device through the communication channel.

7. The apparatus of claim 1, wherein the at least one off-device resource includes a supplemental functional device, and the apparatus further includes a peripheral interface at least partially supported by the housing and connectable to the supplemental functional device.

8. The apparatus of claim 1, further comprising a power supply, at least partially supported by the housing, provided to supply power to the at least one off-device resource, the local communication device, and the controller.

9. The apparatus of claim 8, wherein the power supply is operable to provide power to one or more of the personal communication device or a supplemental functional device.

10. A method comprising:
at an apparatus including a housing arranged to hold a personal communication device and a controller, wherein the housing at least partially supports at least one off-device resource, including a remote communication interface, that provides an alternate to at least one corresponding on-device resource, including a communication interface, integrated with the personal communication device, wherein the remote communication interface provides an alternative data transport with a secure remote server:
establishing a communication channel between the at least one off-device resource and the personal communication device;
detecting, through the communication channel, access to the at least one corresponding on-device resource; and
facilitating, through the communication channel, resource scheduling between the at least one off-device resource and the at least one corresponding on-device resource in response to detecting the access to the at least one corresponding on-device resource, including extending the communication channel to the secure remote server and utilizing the remote communication interface to direct communications associated with the communication interface to the secure remote server via the communication channel.

11. The method of claim 10, wherein:
detecting the access to the at least one corresponding on-device resource includes detecting a request to execute a process on a processor of the personal communication device; and
facilitating the resource scheduling includes scheduling executing at least a portion of the process on one or more processors of the apparatus.

12. The method of claim 10, wherein:
detecting the access to the at least one corresponding on-device resource includes detecting a request to access data stored in a storage of the personal communication device; and
facilitating the resource scheduling includes providing a portion or a variation of the data stored in a secure non-transitory memory of the apparatus in response to detecting the request.

13. The method of claim 12, further comprising:
storing an identifier of the apparatus in the secure non-transitory memory;
using the identifier to obtain a certificate of a safe process to be executed on the apparatus in response to a certificate signing request, and
storing the certificate in the secure non-transitory memory.

14. The method of claim 13, wherein facilitating the resource scheduling includes:
detecting a request to execute a process on the personal communication device;
comparing a signature of the process with the certificate; and
executing the process on the apparatus in accordance with a determination that the signature matches the certificate.

15. The method of claim 10, wherein detecting the access to the at least one corresponding on-device resource includes detecting a request to communicate with the communication interface.

16. The method of claim 15, wherein facilitating the resource scheduling includes:
in response to detecting the request, encrypting a the alternative data transport between the communication interface and the secure remote server through the communication channel.

17. The method of claim 10, wherein:
the corresponding at least one on-device resource includes a first communication device;
the at least one off-device resource includes a second communication device; and
facilitating the resource scheduling between the at least one off-device resource and the corresponding at least one on-device resource through the communication channel includes:
disabling, via the communication channel, direct communication between the first communication device and a third communication device;
directing the second communication device to exchange messages with the third device; and
filtering the messages to communicate filtered messages to the first communication device through the communication channel.

18. The method of claim 10, wherein the at least one off-device resource includes a supplemental functional device, and the apparatus further includes a peripheral interface at least partially supported by the housing and connectable to the supplemental functional device.

19. The method of claim 18, further comprising extending the communication channel to the supplemental function functional device via the peripheral interface.

20. The method of claim 19, wherein detecting, through the communication channel, the access to the at least one corresponding on-device resource includes:
   directing, via the peripheral interface, the supplemental functional device to detect radio frequency energy to or from the personal communication device; and
   receiving, via the peripheral interface, from the supplemental functional device data converted from the radio frequency energy that are associated with the communications.

* * * * *